United States Patent
Hapsari et al.

(10) Patent No.: US 10,757,617 B2
(45) Date of Patent: Aug. 25, 2020

(54) BASE STATION AND DATA TRANSFER METHOD

(71) Applicant: NTT DOCOMO, INC., Tokyo (JP)

(72) Inventors: Wuri Andarmawanti Hapsari, Tokyo (JP); Tooru Uchino, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/508,024

(22) PCT Filed: Sep. 2, 2015

(86) PCT No.: PCT/JP2015/075010
§ 371 (c)(1),
(2) Date: Mar. 1, 2017

(87) PCT Pub. No.: WO2016/035835
PCT Pub. Date: Mar. 10, 2016

(65) Prior Publication Data
US 2017/0289871 A1    Oct. 5, 2017

(30) Foreign Application Priority Data

Sep. 3, 2014 (JP) .................................. 2014-179618

(51) Int. Cl.
*H04W 36/02* (2009.01)
*H04W 76/20* (2018.01)
(Continued)

(52) U.S. Cl.
CPC ........... *H04W 36/02* (2013.01); *H04W 16/32* (2013.01); *H04W 40/34* (2013.01); *H04W 40/36* (2013.01);
(Continued)

(58) Field of Classification Search
CPC ......... H04W 36/0083; H04W 36/0061; H04W 36/08; H04W 36/0022; H04W 36/0088;
(Continued)

(56) References Cited

U.S. PATENT DOCUMENTS

| 2014/0233384 A1* | 8/2014 | Howard ............ H04W 28/0289 370/235 |
| 2014/0269632 A1* | 9/2014 | Blankenship ....... H04W 76/025 370/336 |

(Continued)

OTHER PUBLICATIONS

International Search Report issued in corresponding application No. PCT/JP2015/075010 dated Nov. 24, 2015 (4 pages).

(Continued)

*Primary Examiner* — Nizar N Sivji
(74) *Attorney, Agent, or Firm* — Osha Liang LLP

(57) ABSTRACT

A base station in a master cell group configured to establish a bearer to a mobile station together with a base station in a secondary cell group for communication includes a data transfer instruction unit configured to transmit to the base station in the secondary cell group an instruction on whether to transfer downlink data in the base station in the secondary cell group to the base station in the master cell group upon deletion or modification of the secondary cell group or upon deletion of the bearer in the secondary cell group; a reception unit configured to receive the downlink data transferred from the base station in the secondary cell group according to the instruction; and a transmission unit configured to transmit the received downlink data to the mobile station.

5 Claims, 11 Drawing Sheets

(51) Int. Cl.
  *H04W 16/32*  (2009.01)
  *H04W 40/34*  (2009.01)
  *H04W 72/04*  (2009.01)
  *H04W 76/15*  (2018.01)
  *H04W 40/36*  (2009.01)

(52) U.S. Cl.
  CPC ....... *H04W 72/04* (2013.01); *H04W 72/0406* (2013.01); *H04W 76/15* (2018.02); *H04W 76/20* (2018.02)

(58) Field of Classification Search
  CPC . H04W 36/24; H04W 36/00; H04W 36/0072; H04W 84/045; H04W 36/0033; H04W 36/04; H04W 76/028; H04W 76/027; H04W 76/045; H04W 92/20; H04W 52/0206
  See application file for complete search history.

(56) References Cited

U.S. PATENT DOCUMENTS

| | | | |
|---|---|---|---|
| 2015/0208235 A1* | 7/2015 | Ingale | H04W 12/04 455/411 |
| 2016/0277987 A1* | 9/2016 | Chen | H04L 5/0085 |

OTHER PUBLICATIONS

Written Opinion of the International Searching Authority issued in corresponding application No. PCT/JP2015/075010 dated Nov. 24, 2015 (4 pages).

3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)"; Dec. 2013 (71 pages).

Extended European Search Report issued in corresponding European Application No. 15838672.2, dated Aug. 9, 2017 (10 pages).

RAN3; "Introduction of Dual Connectivity (RAN3 topics)"; 3GPP TSG-RAN2 Meeting #86, R2-142959; Seoul, Korea; May 19-23, 2014 (63 pages).

Ericsson; "When and how to support data forwarding for dual connectivity"; 3GPP TSG-RAN WG3 Meeting #83bis, R3-140816; San Jose del Cabo, Mexico; Mar. 31-Apr. 4, 2014 (7 pages).

Ericsson; "Introduction of Dual Connectivity"; 3GPP TSG-RAN WG3 Meeting #85, R3-142044; Dresden, Germany; Aug. 18-22, 2014 (106 pages).

Office Action issued in the counterpart European Patent Application No. 15838672.2, dated Jun. 18, 2018 (6 pages).

Office Action issued in counterpart Japanese Patent Application No. 2016-546682, dated Jun. 11, 2019 (9 pages).

Office Action issued in the counterpart European Patent Application No. 15838672.2, dated Aug. 16, 2019 (5 pages).

Huawei; "SeNB Change and Data Forwarding"; 3GPP TSG-RAN WG3 Meeting #83bis, R3-140568; San Jose del Cabo, Mexico; Mar. 31-Apr. 4, 2014 (5 pages).

Decision of Refusal issued in counterpart Japanese Patent Application No. 2016-546682, dated Sep. 3, 2019 (11 Pages).

* cited by examiner

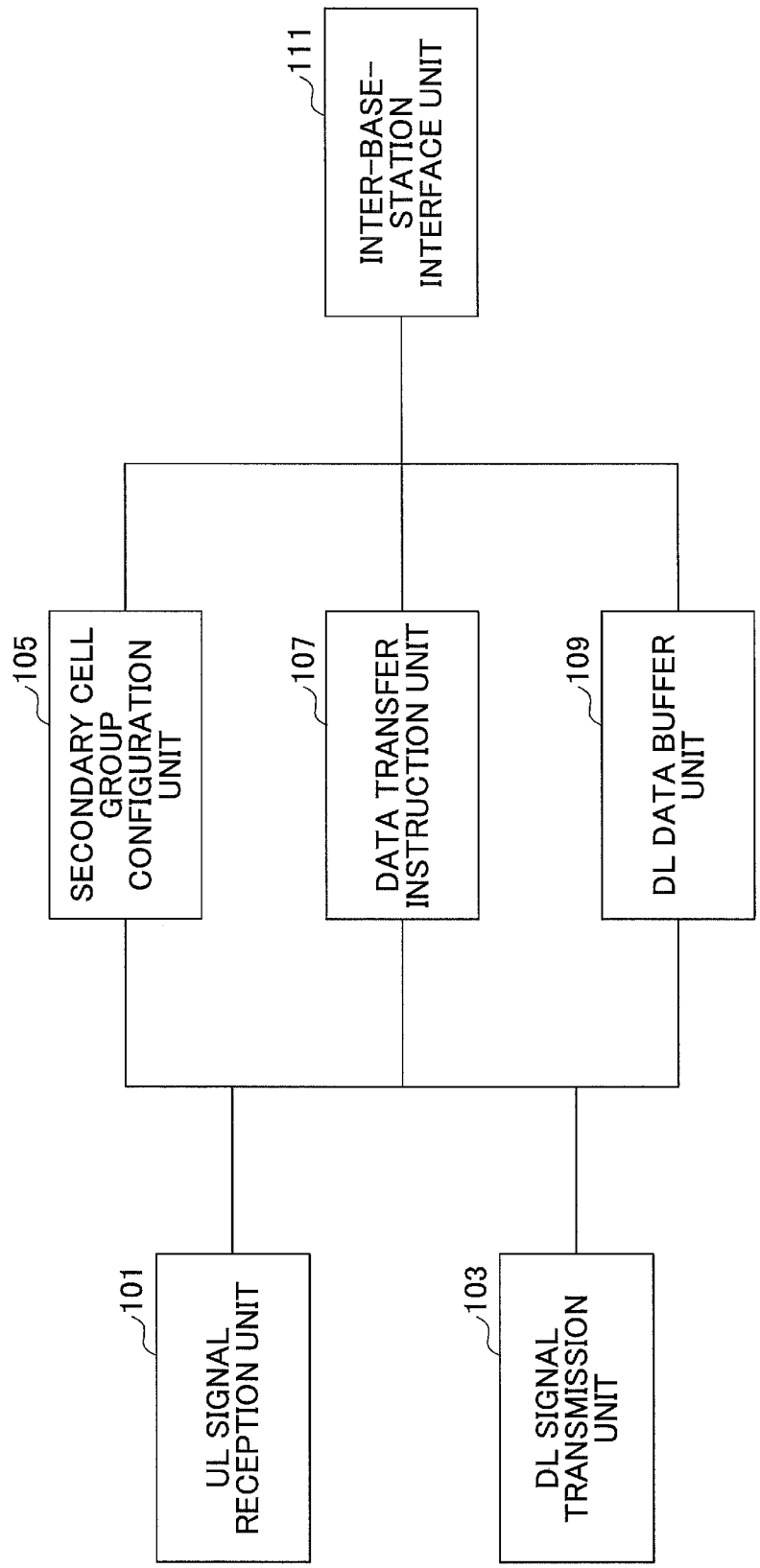

BASE STATION AND DATA TRANSFER METHOD

TECHNICAL FIELD

The present invention relates to a base station and a data transfer method.

BACKGROUND ART

In an LTE-Advanced (Long Term Evolution-Advanced) system, CA (Carrier Aggregation) is under discussion to achieve higher throughput using a plurality of CCs (Component Carriers). According to CA, an MCG (Master Cell Group) and an SCG (Secondary Cell Group) are provided. The MCG is reliable and used to maintain connectivity with a mobile station (UE: User Equipment). The SCG is additionally configured for a mobile station connecting to the MCG.

According to CA, not only a plurality of CCs belonging to the same base station but also CCs belonging to different base stations can be used. Communication using CCs belonging to different base stations is referred to as "Dual Connectivity" (see Non-Patent Document 1). In Dual Connectivity, a base station corresponding to an MCG is referred to as an "MeNB (Master eNB)" and a base station corresponding to an SCG is referred to as an "SeNB (Secondary eNB)". Dual Connectivity is useful when all CCs cannot be accommodated in a single base station or when higher throughput needs to be achieved in an area where an ideal backhaul cannot be adequately installed.

According to Dual Connectivity, two types of architecture referred to as "MeNB anchor" and "S-GW anchor" are defined for a bearer established between a network and a mobile station. FIGS. 1A and 1B show bearer architecture in Dual Connectivity. MeNB anchor shown in FIG. 1A is a scheme in which an MeNB distributes data received from an S-GW (Serving Gateway) to an SeNB. A bearer provided according to MeNB anchor is referred to as a "Split Bearer". S-GW anchor shown in FIG. 1B is a scheme in which an S-GW distributes data to an MeNB and an SeNB. A bearer provided according to S-GW anchor is referred to as an "SCG Bearer".

These types of bearer architecture are implemented upon a procedure to configure a new SCG, upon a procedure to offload an established bearer from an MCG to an SCG, or upon a procedure to establish a new bearer.

PRIOR ART DOCUMENT

Non-Patent Document

[Non-Patent Document 1] 3GPP TR 36.842 V12.0.0 (2013-12)

DISCLOSURE OF INVENTION

Problem(s) to be Solved by the Invention

After a Split Bearer shown in FIG. 1A or an SCG Bearer shown in FIG. 1B is established, the Split Bearer or the SCG Bearer may be reconfigured as an MCB Bearer, that is a bearer established in an MCG (a bearer established between an MeNB and a mobile station) under certain circumstances. For example, when an SeNB requests an MeNB to modify the bearer due to a workload of the SCG, when an MeNB determines to modify the bearer due to a change in QoS (Quality of Service) of the bearer, or the like, the Split Bearer or the SCG Bearer is reconfigured as an MCG Bearer. In addition, when the SCG is released because of degradation in radio quality or the like, the Split Bearer or the SCG Bearer is reconfigured as an MCG Bearer.

In a typical radio communication system, a requirement for not losing a packet upon handover needs to be met. In Dual Connectivity, it is also expected that the requirement for not losing a packet upon handover will need to be met. In other words, when a Split Bearer or an SCG Bearer is reconfigured as an MCG Bearer, it is required that data on the bearer should not be lost from the viewpoint of a mobile station.

It is an object of the present invention to meet a requirement for not losing data on a Split Bearer or an SCG Bearer, when the Split Bearer or the SCG Bearer is reconfigured as an MCG Bearer in Dual Connectivity.

Means for Solving the Problem(s)

In one aspect of the present invention, there is provided a base station in a master cell group configured to establish a bearer to a mobile station together with a base station in a secondary cell group for communication, including:

a data transfer instruction unit configured to transmit to the base station in the secondary cell group an instruction on whether to transfer downlink data in the base station in the secondary cell group to the base station in the master cell group upon deletion or modification of the secondary cell group or upon deletion of the bearer in the secondary cell group;

a reception unit configured to receive the downlink data transferred from the base station in the secondary cell group according to the instruction; and a transmission unit configured to transmit the received downlink data to the mobile station.

In another aspect of the present invention, there is provided a base station in a secondary cell group configured to establish a bearer to a mobile station together with a base station in a master cell group for communication, including:

a reception unit configured to receive from the base station in the master cell group an instruction on whether to transfer downlink data in the base station in the secondary cell group to the base station in the master cell group upon deletion or modification of the secondary cell group or upon deletion of the bearer in the secondary cell group; and a data transfer unit configured to transfer the downlink data to the base station in the master cell group according to the instruction upon the deletion or the modification of the secondary cell group or upon the deletion of the bearer in the secondary cell group.

In another aspect of the present invention, there is provided a data transfer method in a base station in a master cell group configured to establish a bearer to a mobile station together with a base station in a secondary cell group for communication, including the steps of:

transmitting to the base station in the secondary cell group an instruction on whether to transfer downlink data in the base station in the secondary cell group to the base station in the master cell group upon deletion or modification of the secondary cell group or upon deletion of the bearer in the secondary cell group;

receiving the downlink data transferred from the base station in the secondary cell group according to the instruction; and transmitting the received downlink data to the mobile station.

In another aspect of the present invention, there is provided a data transfer method in a base station in a secondary cell group configured to establish a bearer to a mobile station together with a base station in a master cell group for communication, including the steps of:

receiving from the base station in the master cell group an instruction on whether to transfer downlink data in the base station in the secondary cell group to the base station in the master cell group upon deletion or modification of the secondary cell group or upon deletion of the bearer in the secondary cell group; and transferring the downlink data to the base station in the master cell group according to the instruction upon the deletion or the modification of the secondary cell group or upon the deletion of the bearer in the secondary cell group.

Advantageous Effect of the Invention

According to the present invention, it is possible to meet a requirement for not losing data on a Split Bearer or an SCG Bearer, when the Split Bearer or the SCG Bearer is reconfigured as an MCG Bearer in Dual Connectivity.

BRIEF DESCRIPTION OF THE DRAWINGS

FIG. 2 shows a block diagram of a base station (MeNB) in accordance with an embodiment of the present invention.

DETAILED DESCRIPTION OF THE PREFERRED EMBODIMENTS

In an embodiment of the present invention, a type of CA (carrier aggregation) where a mobile station (UE) performs communication using cell groups belonging to different base stations is described. This type of CA is referred to as "Dual Connectivity".

Figure 1A:
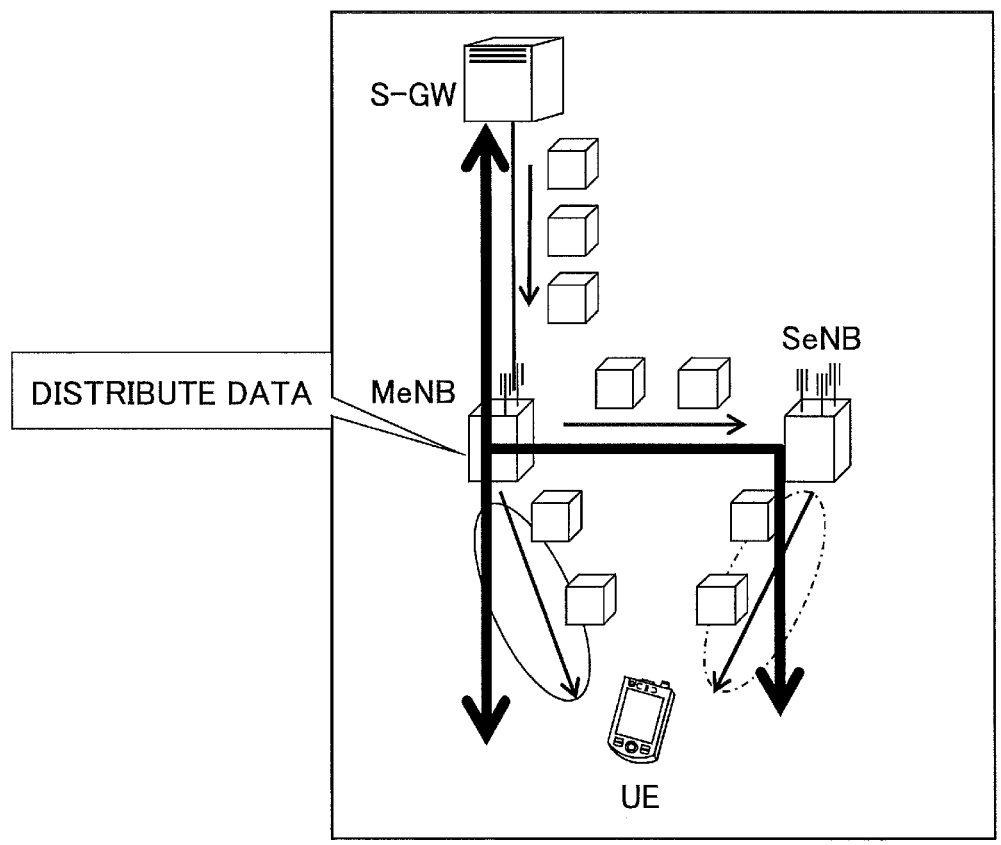
FIG. 1A shows bearer architecture (MeNB anchor) in Dual Connectivity.
Figure 1B:
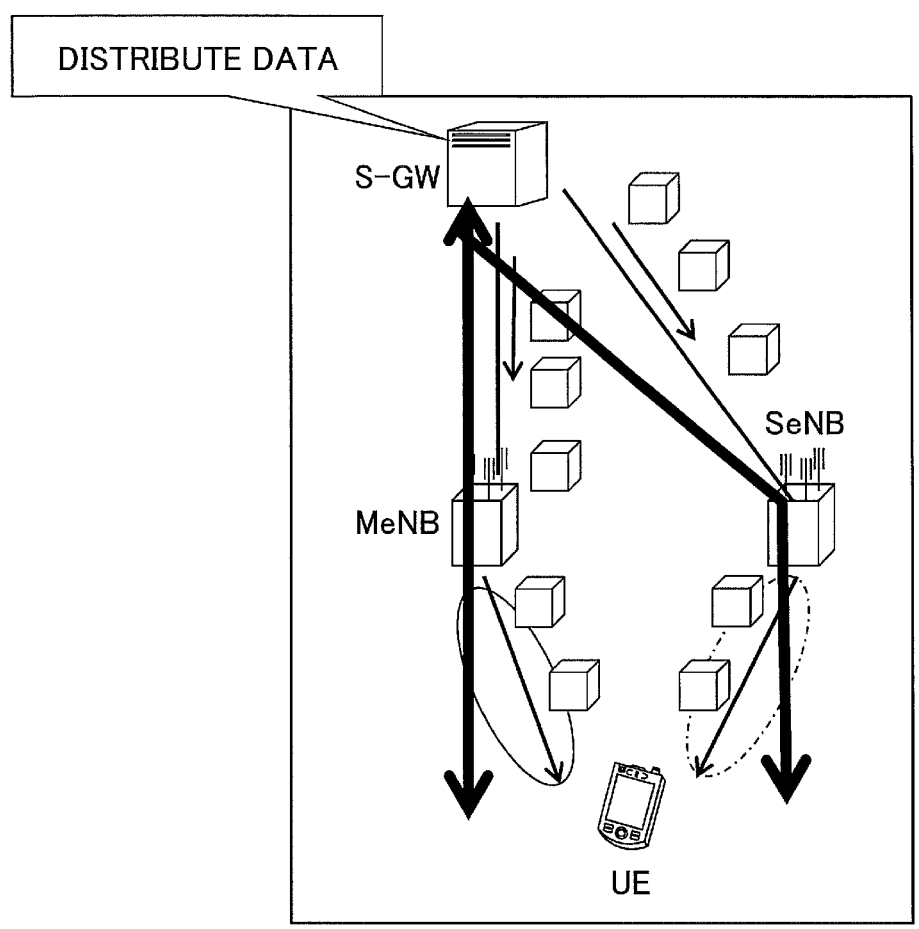
FIG. 1B shows bearer architecture (S-GW anchor) in Dual Connectivity.

As described with reference to FIGS. 1A and 1B, a mobile station (UE) can perform communication using a bearer (Split Bearer or SCG Bearer) established via two base stations (MeNB and SeNB) in Dual Connectivity. In an embodiment of the present invention, when the Split Bearer or the SCG Bearer is reconfigured as an MCG Bearer after the Split Bearer or the SCG Bearer is established in Dual Connectivity, in other words, when an SCG is deleted or modified or when the bearer in the SCG is deleted, a requirement for not losing data on the bearer can be met by transferring downlink data in the SeNB to the MeNB (by data transfer).

However, the downlink data in the SeNB may be stored in a buffer of the MeNB depending on bearer architecture or implementation of the MeNB, and thus data transfer is not always needed. In an embodiment of the present invention, the MeNB provides an instruction on whether data transfer is needed to the SeNB to achieve efficient data transfer.

Specific configurations of the base stations (MeNB and SeNB) will be described below.

<Configuration of a Base Station (MeNB)>

FIG. 2 shows a block diagram of a base station (MeNB) in accordance with an embodiment of the present invention. The MeNB 10 includes a UL signal reception 101, a DL signal transmission unit 103, a secondary cell group configuration unit 105, a data transfer instruction unit 107, a DL data buffer unit 109, and an inter-base-station interface unit 111.

The UL signal reception unit 101 receives uplink signals from a UE. The UL signal reception unit 101 receives an RRC (Radio Resource Control) message in addition to data signals from the UE. For example, the UL signal reception unit 101 receives a cell quality report (measurement report), a connection establishment complete notification (RRC connection reconfiguration complete), and so on from the UE.

The DL signal transmission unit 103 transmits downlink signals to the UE. The DL signal transmission unit 103 transmits an RRC message in addition to data signals to the UE. For example, the DL signal transmission unit 103 transmits a connection establishment notification (RRC connection reconfiguration), and so on.

The secondary cell group configuration unit 105 adds a secondary cell group (SCG) based on the cell quality report received from the UE. When quality of a configured SCG is degraded, the secondary cell group configuration unit 105 instructs an SeNB to modify a bearer established in the SCG or release (modify or delete) the SCG. The addition or the release of the SCG or the modification of the bearer is provided to the UE by means of a connection establishment notification (RRC connection reconfiguration).

When a Split Bearer or an SCG Bearer is reconfigured as an MCG Bearer after the Split Bearer or the SCG Bearer is established, in other words, when an SCG is deleted or modified or when the bearer in the SCG is deleted, the data transfer instruction unit 107 transmits to the SeNB an instruction on whether to transfer downlink data in the SeNB to the MeNB. When a plurality of bearers are established in the SeNB, the instruction on whether to transfer downlink data in the SeNB to the MeNB may be provided for each bearer. In addition, the instruction may be transmitted as needed. In other words, when data transfer is not needed, the MeNB may not explicitly transmit an instruction indicating that it is not necessary to transfer the downlink data to the MeNB. In addition, the instruction may be transmitted each time the SCG is deleted or modified or each time the bearer in the SCG is deleted (individual notification) or when an SCG is added (collective notification). If the instruction is provided when an SCG is added (collective notification), the instruction may not be provided each time the SCG is deleted or modified or each time the bearer in the SCG is deleted.

The DL data buffer unit 109 is a buffer to store downlink data to be transmitted to the UE.

For example, when a Split Bearer is established according to MeNB anchor, the DL data buffer unit 109 in the MeNB may store data distributed to the SeNB. When the Split Bearer is reconfigured as an MCG Bearer, the data transfer instruction unit 107 may determine whether to transfer data based on a buffer size of the DL data buffer unit 109. For example, when the buffer size of the DL data buffer unit 109 is larger than a predetermined threshold, the data transfer instruction unit 107 may determine that data transfer is not needed. On the other hand, when the buffer size of the DL data buffer unit 109 is smaller than or equal to the predetermined threshold, the data transfer instruction unit 107 may determine that data transfer is needed.

For example, when an SCG Bearer is established according to S-GW anchor, it is assumed that the DL data buffer unit 109 in the MeNB does not store downlink data for the SeNB. When the SCB bearer is reconfigured as an MCG Bearer, the data transfer instruction unit 107 may determine that data transfer is needed.

The inter-base-station interface unit 111 is a transmission and reception interface for communicating with an SeNB. The interface between the MeNB and the SeNB is referred to as an "X2 interface". The inter-base-station interface unit 111 notifies the SeNB of the addition or release of the SCG or the modification of the bearer determined by the secondary cell group configuration unit 105 and receives its response. In addition, the inter-base-station interface unit 111 receives modification of the bearer requested by the SeNB and transmits its response. Furthermore, the inter-base-station interface unit 111 receives downlink data transferred from the SeNB. The downlink data transferred from the SeNB is scheduled by the MeNB and transmitted via the DL signal transmission unit 103 to the UE.

<Configuration of a Base Station (SeNB)>

Figure 3:
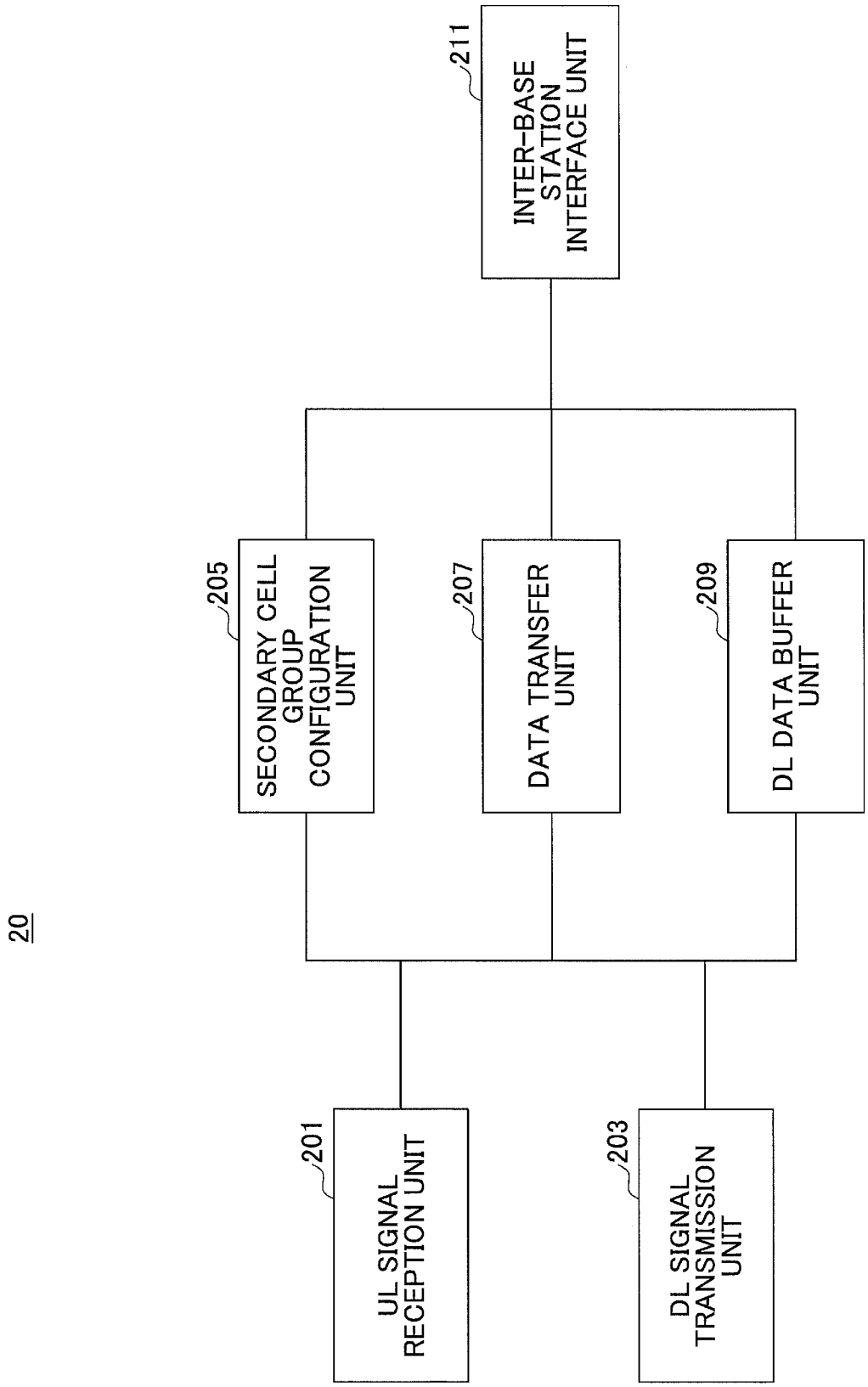
FIG. 3 shows a block diagram of a base station (SeNB) in accordance with an embodiment of the present invention.

FIG. 3 shows a block diagram of a base station (SeNB) in accordance with an embodiment of the present invention. The SeNB 20 includes a UL signal reception 201, a DL signal transmission unit 203, a secondary cell group configuration unit 205, a data transfer unit 207, a DL data buffer unit 209, and an inter-base-station interface unit 211.

The UL signal reception unit 201 receives uplink signals from a UE. Since the SeNB cannot transmit and receive an RRC message, the UL signal reception unit 201 mainly receives data signals from the UE.

The DL signal transmission unit 203 transmits downlink signals to the UE. Since the SeNB cannot transmit and receive an RRC message, the DL signal transmission unit 203 mainly transmits data signals to the UE.

The secondary cell group configuration unit 205 configures an SCG according to an indication from an MeNB to add the SCG. In addition, the secondary cell group configuration unit 205 modifies the configuration of the SCG according to an indication from MeNB to modify a bearer or to release the SCG (to delete or modify the SCG). Furthermore, the secondary cell group configuration unit 205 may request the MeNB to modify a bearer established in the SCG due to a workload of the SeNB or the like.

The data transfer unit 207 transfers downlink data to the MeNB according to an instruction for data transfer received from the MeNB. In other words, when an instruction indicating that the downlink data in the SeNB should be transferred to the MeNB upon deletion or modification of the SCG or upon deletion of the bearer in the SCG is received, the data transfer unit 207 transfers the downlink data to the MeNB. On the other hand, when an instruction indicating that the downlink data in the SeNB should be transferred to the MeNB upon deletion or modification of the SCG or upon deletion of the bearer in the SCG is not received, the data transfer unit 207 does not transfer the downlink data to the MeNB. Alternatively, when an instruction indicating that it is not necessary to transfer the downlink data in the SeNB to MeNB upon deletion or modification of the SCG or upon deletion of the bearer in the SCG is received, the data transfer unit 207 does not transfer the downlink data to the MeNB. The downlink data may include downlink data which are stored in the DL data buffer unit 209 and planned to be transmitted to the UE and downlink data for which an acknowledgement (ACK) is not received from the UE.

The DL data buffer unit 209 is a buffer to store downlink data to be transmitted to the UE.

The inter-base-station interface unit 211 is a transmission and reception interface for communicating with an MeNB. The inter-base-station interface unit 211 receives an indication of addition or release of the SCG or modification of the bearer determined by the MeNB and transmits its response. In addition, the inter-base-station interface unit 211 requests the MeNB to modify the bearer and receives its response. Furthermore, the inter-base-station interface unit 211 transfers downlink data to the MeNB when data transfer is needed upon deletion or modification of the SCG or upon deletion of the bearer in the SCG.

<Sequence of a Data Transfer Method (Individual Notification)>

In the following, there is a description of a procedure to transmit an instruction on whether to transfer downlink data in the SeNB to the MeNB each time an SCG is deleted or modified or each time a bearer in the SCG is deleted (individual notification).

Figure 4:
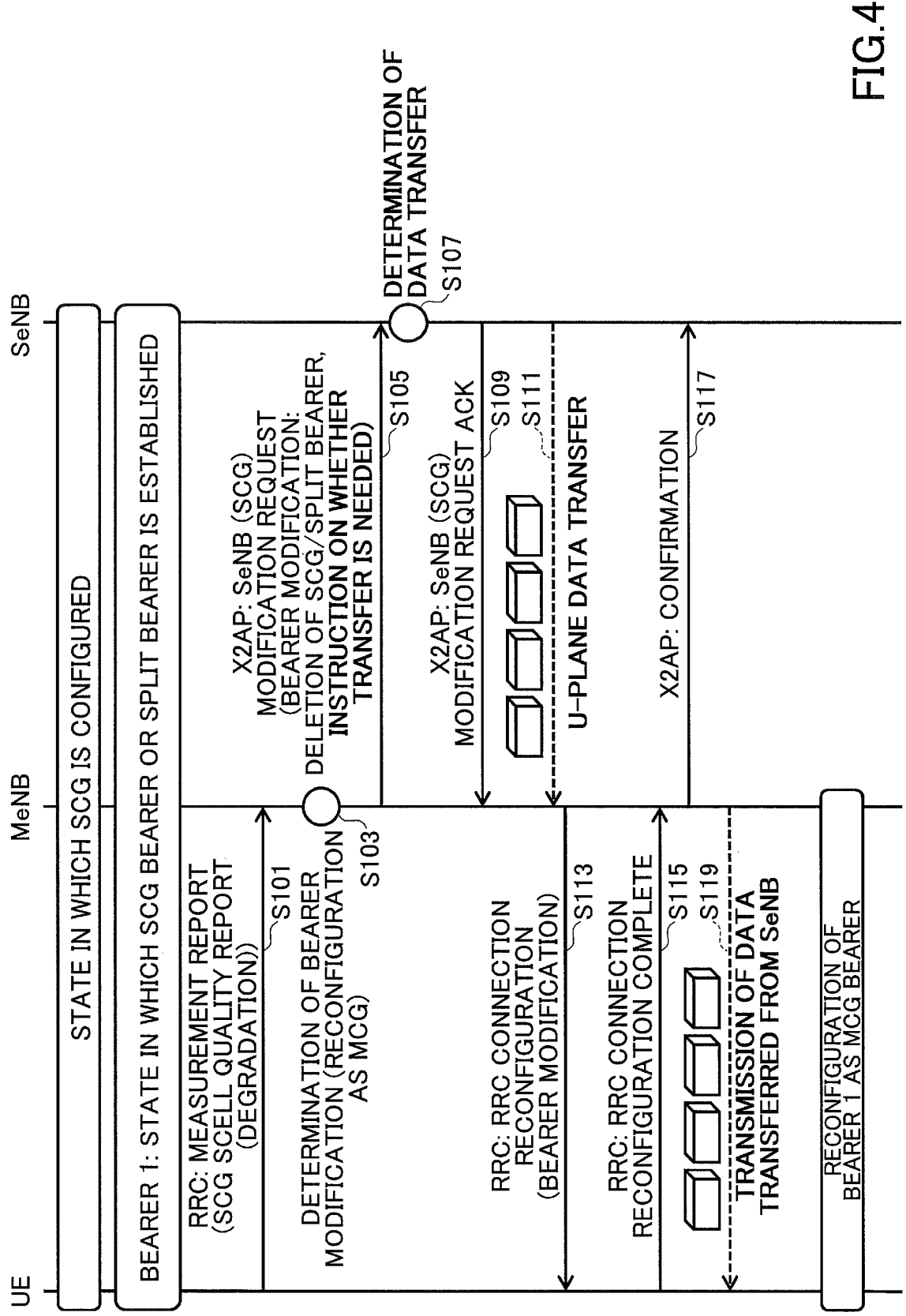
FIG. 4 shows a sequence diagram of a data transfer method in an embodiment of the present invention (in the case where an MeNB determines to modify a bearer).

FIG. 4 shows a sequence diagram of a data transfer method in an embodiment of the present invention (in the case where an MeNB determines to modify a bearer).

It is assumed that an SCG is configured for a UE and a bearer (Split Bearer or SCG Bearer) is established in both the MCG and the SCG.

The MeNB periodically receives a cell quality report (measurement report) from the UE (S101). For example, when cell quality does not satisfy QoS of the bearer, the MeNB determines that the Split Bearer or the SCG Bearer is to be reconfigured as an MCG Bearer (S103). The MeNB transmits an SeNB (SCG) modification request to the SeNB to delete the Split Bearer or the SCG Bearer (S105). The SeNB (SCG) modification request includes a bearer modification indication that the Split Bearer or the SCG Bearer is to be deleted and an instruction on whether data transfer is needed.

When the SeNB receives the SeNB (SCG) modification request and identifies that data transfer is needed, the SeNB determines to transfer downlink data to the MeNB (S107). When the SeNB receives the SeNB (SCG) modification request, the SeNB stops scheduling and also stops downlink data transmission. Then, the SeNB transmits a response to the SeNB (SCG) modification request called an SeNB (SCG) modification request ACK to the MeNB (S109), and transmits the downlink data (U-plane data) to the MeNB (S111). For example, the downlink data transferred to the MeNB includes downlink data stored in the buffer after the SeNB stops scheduling (S107) and downlink data for which acknowledgement (ACK) is not received from the UE.

The MeNB provides the modification of the bearer by means of an RRC connection reconfiguration (S113) and receives its response called an RRC connection reconfiguration complete (S115). The MeNB notifies the SeNB that the modification of the bearer is complete (S117) and transmits the downlink data transferred from the SeNB to the UE (S119).

Figure 5:
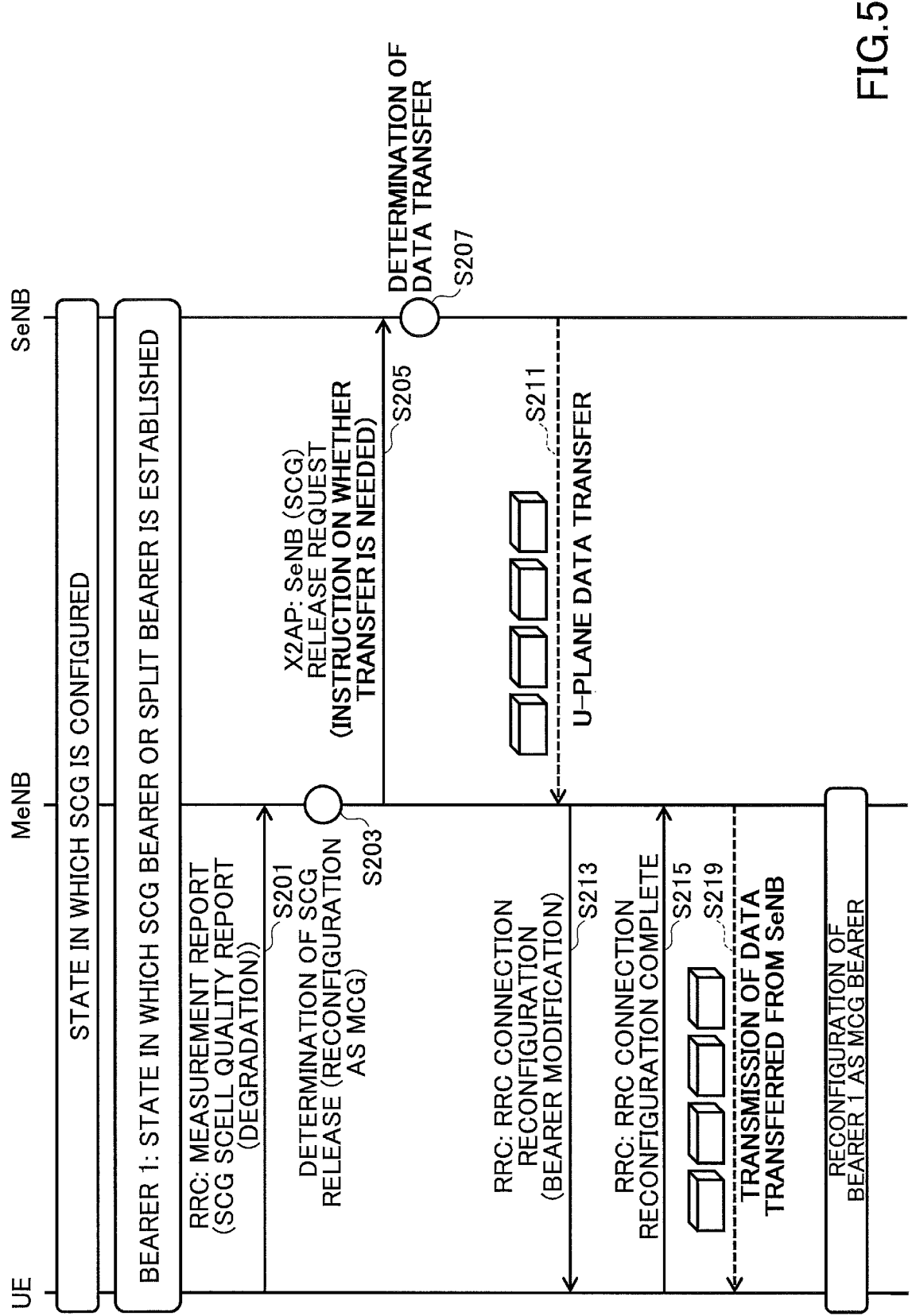
FIG. 5 shows a sequence diagram of a data transfer method in an embodiment of the present invention (in the case where an SCG is released).

FIG. 5 shows a sequence diagram of a data transfer method in an embodiment of the present invention (in the case where an SCG is released).

It is assumed that an SCG is configured for a UE and a bearer (Split Bearer or SCG Bearer) is established in both the MCG and the SCG.

The MeNB periodically receives a cell quality report (measurement report) from the UE (S201). For example, when cell quality is degraded, the MeNB determines that SCG is to be released (S203). The MeNB transmits an SeNB (SCG) release request to the SeNB to release the SCG (S205). The SeNB (SCG) release request includes an instruction on whether data transfer is needed.

When the SeNB receives the SeNB (SCG) release request and identifies that data transfer is needed, the SeNB determines to transfer downlink data to the MeNB (S207). When the SeNB receives the SeNB (SCG) release request, the SeNB stops scheduling and also stops downlink data transmission. Then, the SeNB transmits the downlink data (U-plane data) to the MeNB (S211). For example, the downlink data transferred to the MeNB includes downlink data stored in the buffer after the SeNB stops scheduling (S207) and downlink data for which acknowledgement (ACK) is not received from the UE.

The following steps (S213-S219) are performed in the same manner as the corresponding steps (S113-S119) shown in FIG. 4.

While FIG. 5 shows the case where an SCG is deleted, a similar procedure of data transfer can be applied to the case where an SCG is modified. Specifically, when an SeNB is switched to another SeNB, an instruction on whether data transfer is needed is provided to the SeNB before the switch by means of an SeNB (SCG) release request. When the SeNB before the switch is the same as the SeNB after the switch even if the SCG is modified, the SeNB determines that data transfer is not needed.

Figure 6:
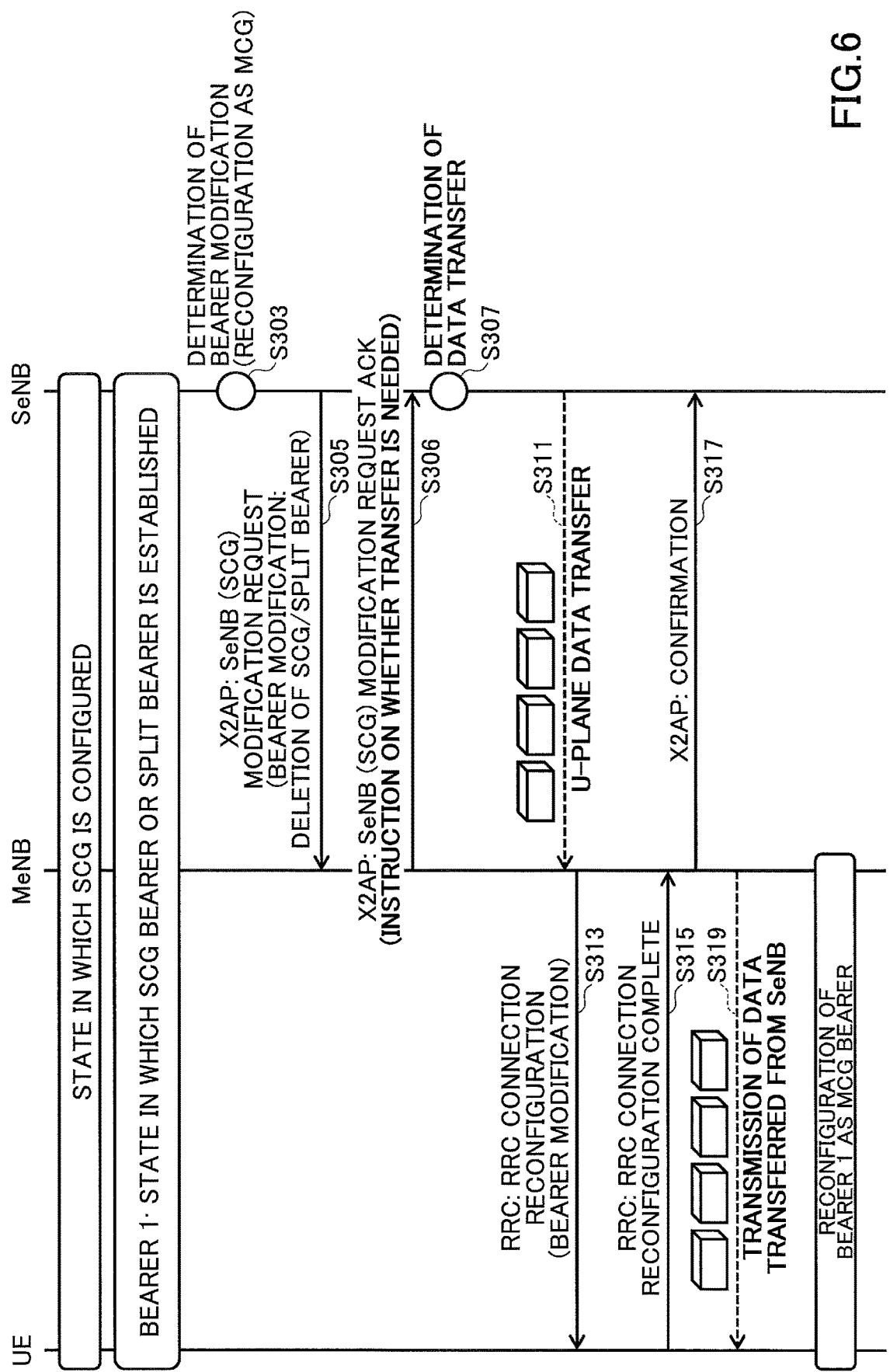
FIG. 6 shows a sequence diagram of a data transfer method in an embodiment of the present invention (in the case where an SeNB determines to modify a bearer).

FIG. 6 shows a sequence diagram of a data transfer method in an embodiment of the present invention (in the case where an SeNB determines to modify a bearer).

It is assumed that an SCG is configured for a UE and a bearer (Split Bearer or SCG Bearer) is established in both the MCG and the SCG.

When a workload of the SeNB exceeds a predetermined threshold, the SeNB determines to reconfigure the Split Bearer or the SCG Bearer as an MCG Bearer (S303). The SeNB transmits an SeNB (SCG) modification request to the MeNB to delete the bearer (S305). The MeNB transmits its response called an SeNB (SCG) modification request ACK to the SeNB (S306). The SeNB (SCG) modification request ACK includes an instruction on whether data transfer is needed.

When the SeNB receives the SeNB (SCG) modification request ACK and identifies that data transfer is needed, the SeNB determines to transfer downlink data to the MeNB (S307). When the SeNB receives the SeNB (SCG) modification request ACK, the SeNB stops scheduling and also stops downlink data transmission. Then, the SeNB transmits the downlink data (U-plane data) to the MeNB (S311). For example, the downlink data transferred to the MeNB includes downlink data stored in the buffer after the SeNB stops scheduling (S307) and downlink data for which acknowledgement (ACK) is not received from the UE.

The following steps (S313-S319) are performed in the same manner as the corresponding steps (S113-S119) shown in FIG. 4.

<Sequence of a Data Transfer Method (Collective Notification)>

In the following, there is a description of a procedure to transmit an instruction on whether to transfer downlink data in the SeNB to the MeNB each time an SCG is added (collective notification). In this case, the instruction may not be provided each time the SCG is deleted or modified or each time a bearer in the SCG is deleted.

Figure 7:
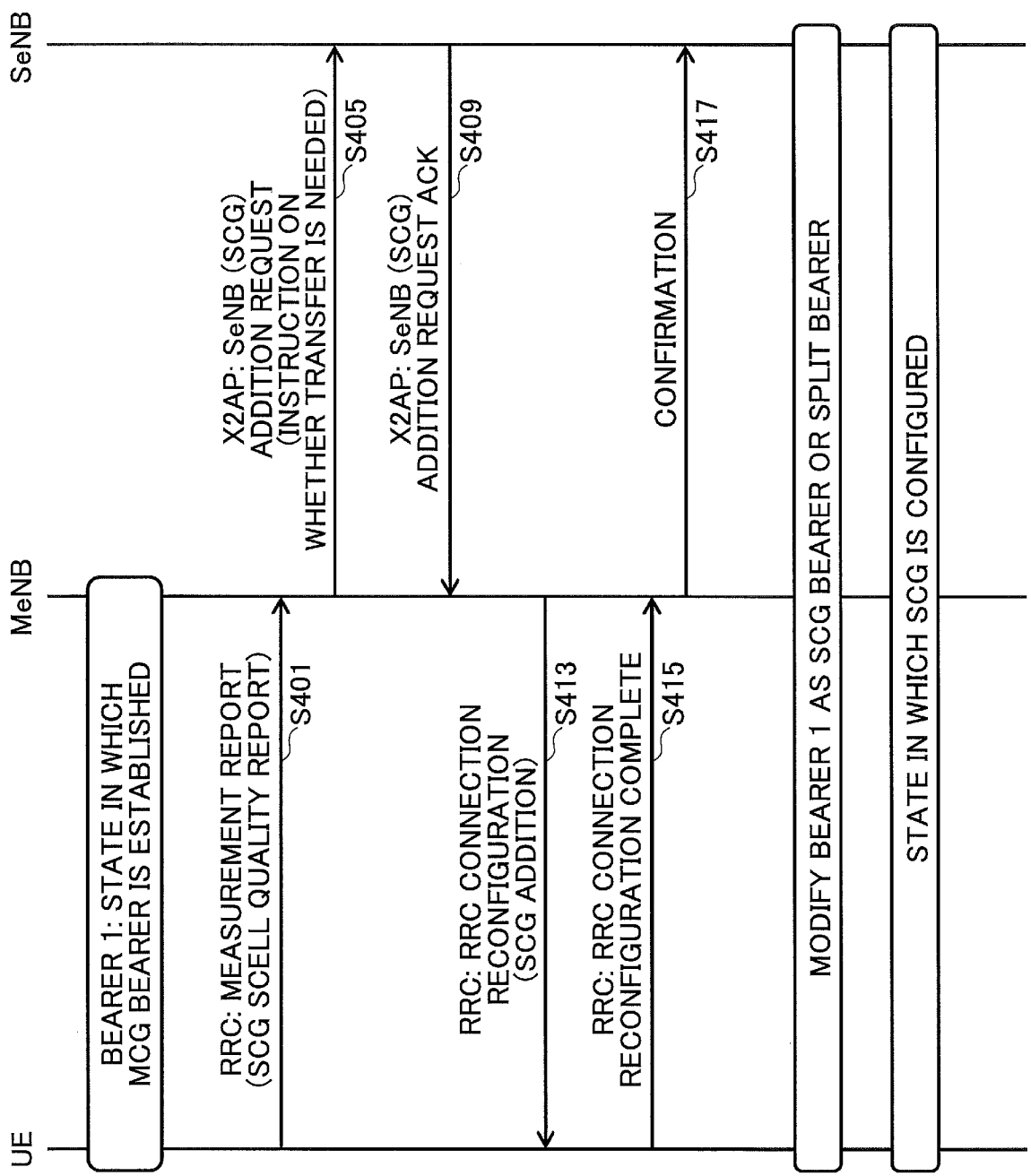
FIG. 7 shows a sequence diagram of a data transfer method in an embodiment of the present invention (in the case where an instruction on whether data transfer is needed is provided upon addition of a cell as a collective notification).

FIG. 7 shows a sequence diagram of a data transfer method in an embodiment of the present invention (in the case where an instruction on whether data transfer is needed is provided upon addition of a cell as a collective notification).

It is assumed that a bearer (MCG Bearer) is established in an MCG and an SCG is not added.

The MeNB periodically receives a cell quality report (measurement report) from the UE (S401). When the MeNB determines that an SCG is to be added based on the cell quality report, the MeNB transmits an SeNB (SCG) addition request to the SeNB to add an SCG (S405). The SeNB (SCG) addition request includes an instruction on whether data transfer is needed. The instruction on whether data transfer is needed indicates whether downlink data in the SeNB should be transferred to the MeNB when the SCG is deleted or modified or when a bearer established in the SCG is deleted and reconfigured as an MCG Bearer.

When the SeNB receives the SeNB (SCG) addition request and receives whether data transfer is needed, the SeNB transmits its response called an SeNB (SCG) addition request ACK to the MeNB (S409).

The MeNB notifies the UE that an SCG is to be added by means of an RRC connection reconfiguration (S413) and receives its response called an RRC connection reconfiguration complete (S415). The MeNB notifies the SeNB that the addition of the SCG is complete (S417). As a result, the SCG is configured and the MCG Bearer is reconfigured as a Split Bearer or an SCG Bearer.

Next, procedures of data transfer in the case of a collective notification are described.

Figure 8:
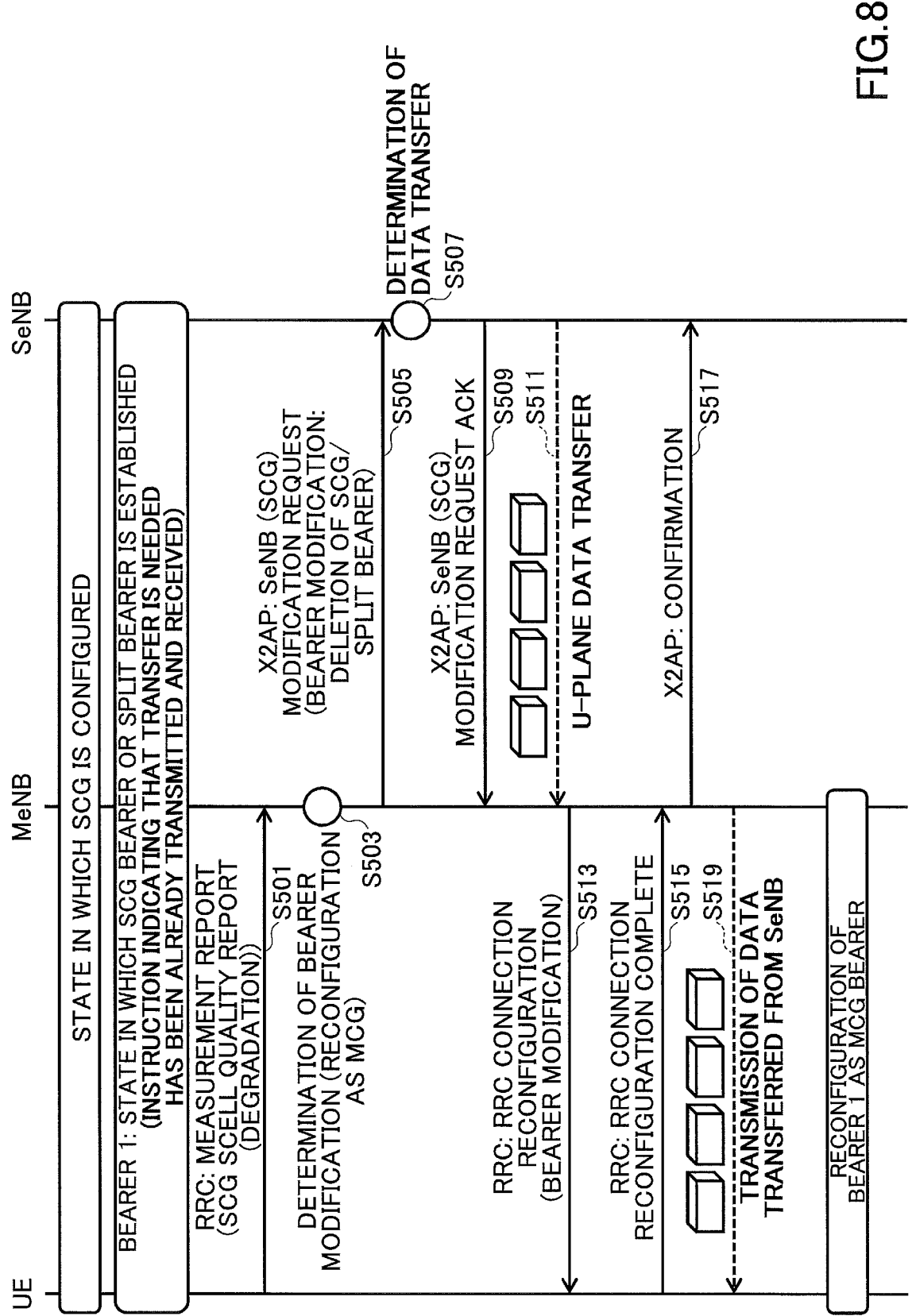
FIG. 8 shows a sequence diagram of a data transfer method in an embodiment of the present invention (in the case where an MeNB determines to modify a bearer after a collective notification).

FIG. 8 shows a sequence diagram of a data transfer method in an embodiment of the present invention (in the case where an MeNB determines to modify a bearer after a collective notification).

The procedure to modify the bearer according to the determination by the MeNB after a collective notification is the same as the procedure shown in FIG. 4, except that the SeNB (SCG) modification request in step S505 does not include an instruction on whether data transfer is needed. As described with reference to FIG. 7, the instruction on whether data transfer is needed is provided upon the addition of the SCG, the SeNB determines whether to transfer data according to the provided instruction (S507).

Figure 9:
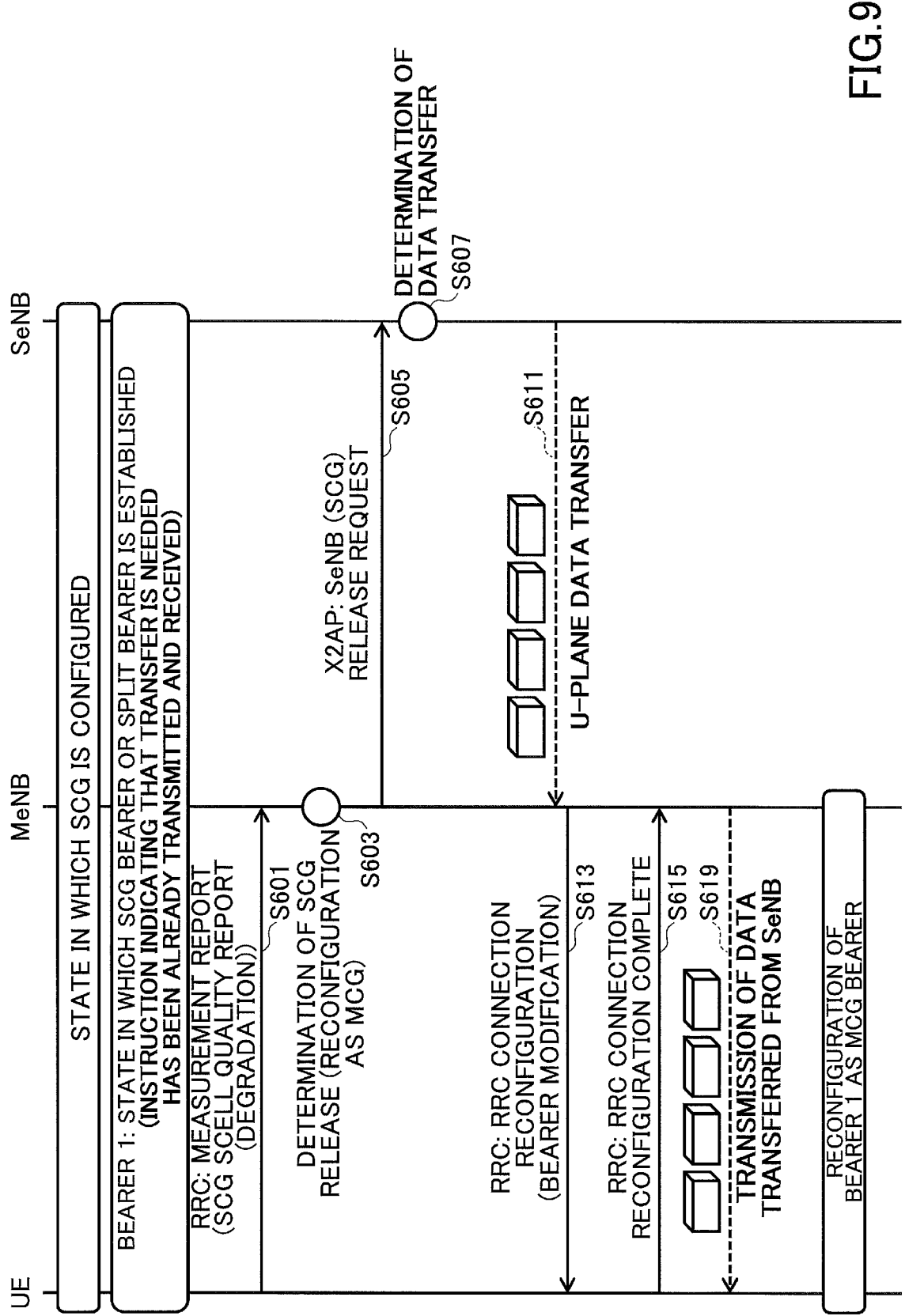
FIG. 9 shows a sequence diagram of a data transfer method in an embodiment of the present invention (in the case where an SCG is released after a collective notification).

FIG. 9 shows a sequence diagram of a data transfer method in an embodiment of the present invention (in the case where an SCG is released after a collective notification).

The procedure to release the SCG after a collective notification is the same as the procedure shown in FIG. 5, except that the SeNB (SCG) release request in step S605 does not include an instruction on whether data transfer is needed. As described with reference to FIG. 7, the instruction on whether data transfer is needed is provided upon the addition of the SCG, the SeNB determines whether to transfer data according to the provided instruction (S607).

It should be noted that a similar procedure of data transfer as shown in FIG. 9 can be applied to the case where an SCG is modified. Specifically, when an SeNB is switched to another SeNB, the SeNB before the switch determines whether to transfer data according to the instruction on whether data transfer is needed, which is provided upon the addition of the SCG. When the SeNB before the switch is the same as the SeNB after the switch even if the SCG is modified, the SeNB determines that data transfer is not needed even if the collective notification indicates that data transfer is needed.

Figure 10:
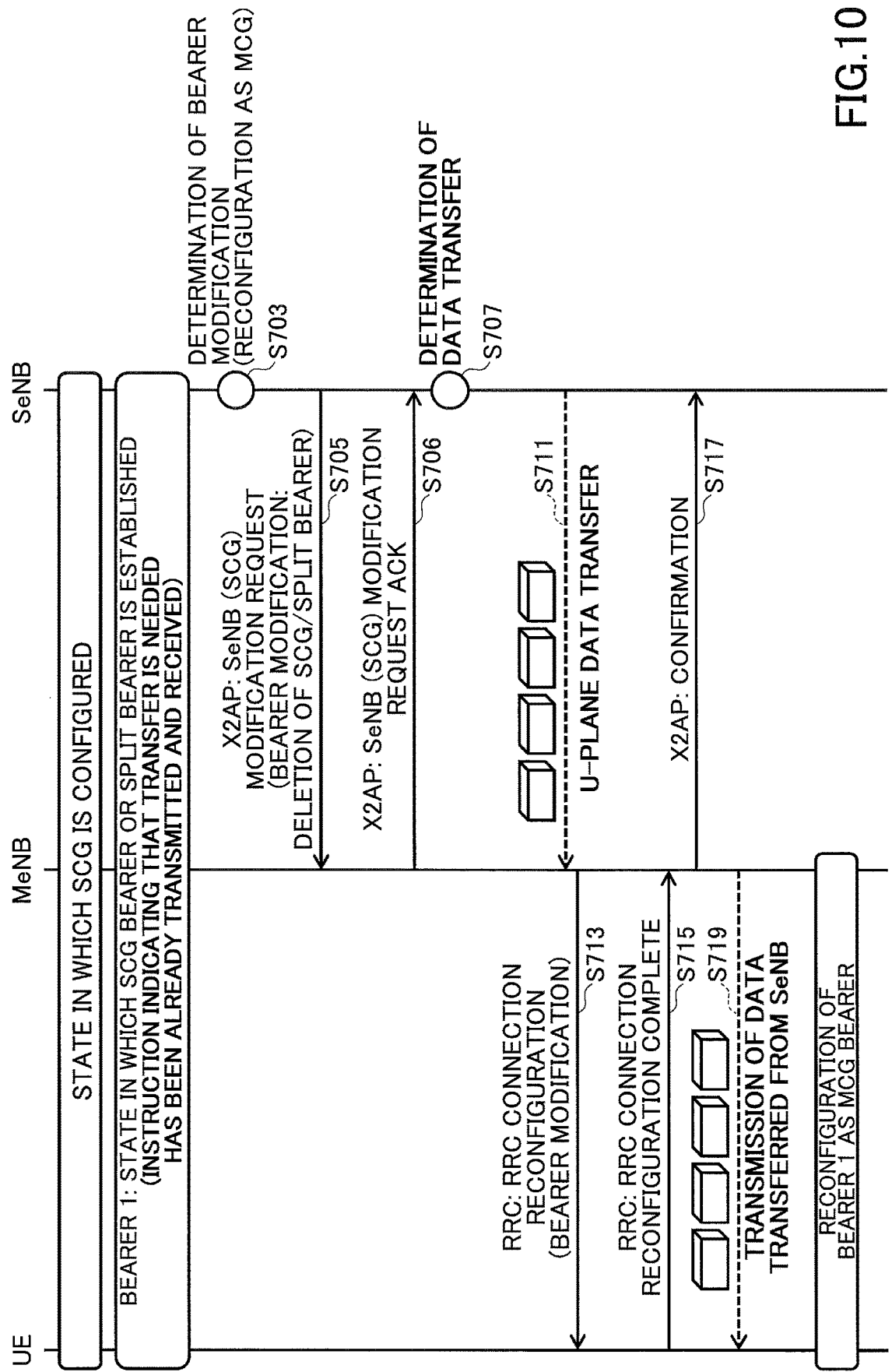
FIG. 10 shows a sequence diagram of a data transfer method in an embodiment of the present invention (in the case where an SeNB determines to modify a bearer after a collective notification).

FIG. 10 shows a sequence diagram of a data transfer method in an embodiment of the present invention (in the case where an SeNB determines to modify a bearer after a collective notification).

The procedure to modify the bearer according to the determination by the SeNB after a collective notification is the same as the procedure shown in FIG. 6, except that the SeNB (SCG) modification request in step S706 does not include an instruction on whether data transfer is needed. As described with reference to FIG. 7, the instruction on whether data transfer is needed is provided upon the addition of the SCG, the SeNB determines whether to transfer data according to the provided instruction (S707).

While the description of the collective notification and the description of the individual notification are separately provided, the collective notification and the individual notification may be combined. For example, when the individual notification is provided after the collective notification, the individual notification may be prioritized. Alternatively, when the collective notification is provided after the individual notification, the collective notification may be prioritized.

<Effects of an Embodiment of the Present Invention>

According to an embodiment of the present invention, it is possible to meet a requirement for not losing data on a Split Bearer or an SCG Bearer, when the Split Bearer or the SCG Bearer is reconfigured as an MCG Bearer in Dual Connectivity. In addition, since an MeNB determines whether data transfer is needed depending on bearer architecture or implementation of the MeNB, efficient data transfer can be achieved.

By instructing whether data transfer is needed each time a bearer in an SCG is deleted (individual notification), different kinds of processing can be implemented depending on the bearer. When a plurality of bearers are established, it is possible to implement different kinds of processing for each of the bearers. For example, the MeNB may instruct that reliable data transfer can be implemented for a bearer with a higher QoS requirement.

On the other hand, by instructing whether data transfer is needed upon addition of an SCG (collective notification), the amount of data to be exchanged between the base stations can be reduced.

For convenience of explanation, the base station according to the embodiments of the present invention has been described with reference to functional block diagrams, but the base station may be implemented in hardware, software, or combinations thereof. In addition, two or more functional elements may be combined as appropriate. The method according to the embodiments of the present invention may be carried out in a different order from the order shown in the embodiments.

While the approaches are described above to meet a requirement for not losing data on a Split Bearer or an SCG Bearer, when the Split Bearer or the SCG Bearer is reconfigured as an MCG Bearer in Dual Connectivity, the present invention is not limited to the these embodiments, and variations, modifications, alterations, and substitutions can be made by those skilled in the art without deviating from the spirit of the present invention.

The present international application is based on and claims the benefit of priority of Japanese Patent Application No. 2014-179618 filed on Sep. 3, 2014, the entire contents of which are hereby incorporated by reference.

DESCRIPTION OF NOTATIONS

10 base station (MeNB)
101 UL signal reception
103 DL signal transmission unit
105 secondary cell group configuration unit
107 data transfer instruction unit
109 DL data buffer unit
111 inter-base-station interface unit
20 base station (SeNB)
201 UL signal reception
203 DL signal transmission unit
205 secondary cell group configuration unit
207 data transfer unit
209 DL data buffer unit
211 inter-base-station interface unit

The invention claimed is:

1. A base station in a master cell group, comprising:
a transmitter that transmits to a base station in a secondary cell group an instruction regarding transfer of downlink data in the base station in the secondary cell group to the base station in the master cell group upon modification of the secondary cell group based on a quality report from a mobile station; and
a receiver that receives the downlink data;
wherein the transmitter transmits the downlink data to the mobile station,
wherein the downlink data is a U-plane data, and
wherein when the downlink data is distributed by a serving gateway to the base station in the secondary cell group, the transmitter transmits the instruction to the base station in the secondary cell group.

2. The base station as claimed in claim 1, wherein the transmitter transmits the instruction to the base station in the secondary cell group for the modification of the secondary cell group.

3. A base station in a secondary cell group, comprising:
a receiver that receives from a base station in a master cell group an instruction regarding transfer of downlink data in the base station in the secondary cell group to the base station in the master cell group upon modification of the secondary cell group based on a quality report from a mobile station; and
a transmitter that transfers the downlink data to the base station in the master cell group upon the modification of the secondary cell group;
wherein the downlink data is a U-plane data, and
wherein when the downlink data is distributed by a serving gateway to the base station in the secondary cell group, the receiver receives the instruction from the base station in the master cell group.

4. A data transfer method in a base station in a master cell group, comprising:
- transmitting, with a transmitter, to a base station in a secondary cell group an instruction regarding transfer of downlink data in the base station in the secondary cell group to the base station in the master cell group upon modification of the secondary cell group based on a quality report from a mobile station;
- receiving, with a receiver, the downlink data; and
- transmitting, with the transmitter, the downlink data to the mobile station;
- wherein the downlink data is a U-plane data, and wherein when the downlink data is distributed by a serving gateway to the base station in the secondary cell group, the instruction is transmitted to the base station in the secondary cell group.

5. A data transfer method in a base station in a secondary cell group, comprising:
- receiving, with a receiver, from a base station in a master cell group an instruction regarding transfer of downlink data in the base station in the secondary cell group to the base station in the master cell group upon modification of the secondary cell group based on a quality report from a mobile station; and
- transferring the downlink data to the base station in the master cell group upon the modification of the secondary cell group;
- wherein the downlink data is a U-plane data, and
- wherein when the downlink data is distributed by a serving gateway to the base station in the secondary cell group, the instruction is received from the base station in the master cell group.

* * * * *